United States Patent
Jakob et al.

(10) Patent No.: US 6,942,845 B2
(45) Date of Patent: Sep. 13, 2005

(54) PROCESS FOR IMPROVING THE INTERNAL STABILITY OF SODIUM PERCARBONATE

(75) Inventors: Harald Jakob, Hasselroth (DE); Waldemar Hessberger, Alzenau (DE); Lothar Kaiser, Rheinfelden (DE); Juergen Lattich, Nidderau (DE); Ralph Overdick, Hofheim (DE)

(73) Assignee: Degussa AG, Duesseldorf (DE)

( * ) Notice: Subject to any disclaimer, the term of this patent is extended or adjusted under 35 U.S.C. 154(b) by 98 days.

(21) Appl. No.: 10/025,577

(22) Filed: Dec. 26, 2001

(65) Prior Publication Data

US 2002/0127168 A1 Sep. 12, 2002

(30) Foreign Application Priority Data

Dec. 23, 2000 (DE) .......................................... 100 65 953

(51) Int. Cl.$^7$ .............................................. C01B 15/10
(52) U.S. Cl. .................................................... 423/415.2
(58) Field of Search .............................. 423/415.2, 621, 423/209

(56) References Cited

U.S. PATENT DOCUMENTS

| | | | |
|---|---|---|---|
| 3,917,663 A | * 11/1975 | Kegelart et al. | ......... 423/415.2 |
| 4,020,148 A | * 4/1977 | Mohr et al. | ............... 423/415.2 |
| 4,146,571 A | 3/1979 | Will et al. | |
| 4,171,280 A | * 10/1979 | Maddox et al. | ........ 252/186.32 |
| 4,193,977 A | * 3/1980 | Nakagawa et al. | ...... 423/415.2 |
| 4,421,669 A | * 12/1983 | Brichard | ................. 252/186.25 |

FOREIGN PATENT DOCUMENTS

| | | | | |
|---|---|---|---|---|
| DE | 43 29 205 A1 | | 3/1995 | |
| DE | WO02051745 A2 | * | 7/2002 | |
| EP | 0 396 175 B1 | | 11/1990 | |
| EP | 487256 A1 | * | 5/1992 | ........... C01B/15/10 |
| JP | 54163906 A | * | 12/1979 | ........... C11D/7/54 |
| JP | 57-42510 | | 3/1982 | |
| JP | 59195505 A | * | 11/1984 | ........... C01B/15/10 |
| JP | 01014103 A | * | 1/1989 | ........... C01B/15/10 |

* cited by examiner

*Primary Examiner*—Stanley S. Silverman
*Assistant Examiner*—Peter J. Lish
(74) *Attorney, Agent, or Firm*—Oblon, Spivak, McClelland, Maier & Neustadt, P.C.

(57) ABSTRACT

The invention relates to uncoated and/or coated sodium percarbonate with improved internal stability and storage stability; and, a process that provides uncoated and/or coated sodium percarbonate with improved internal stability and storage stability.

13 Claims, 1 Drawing Sheet

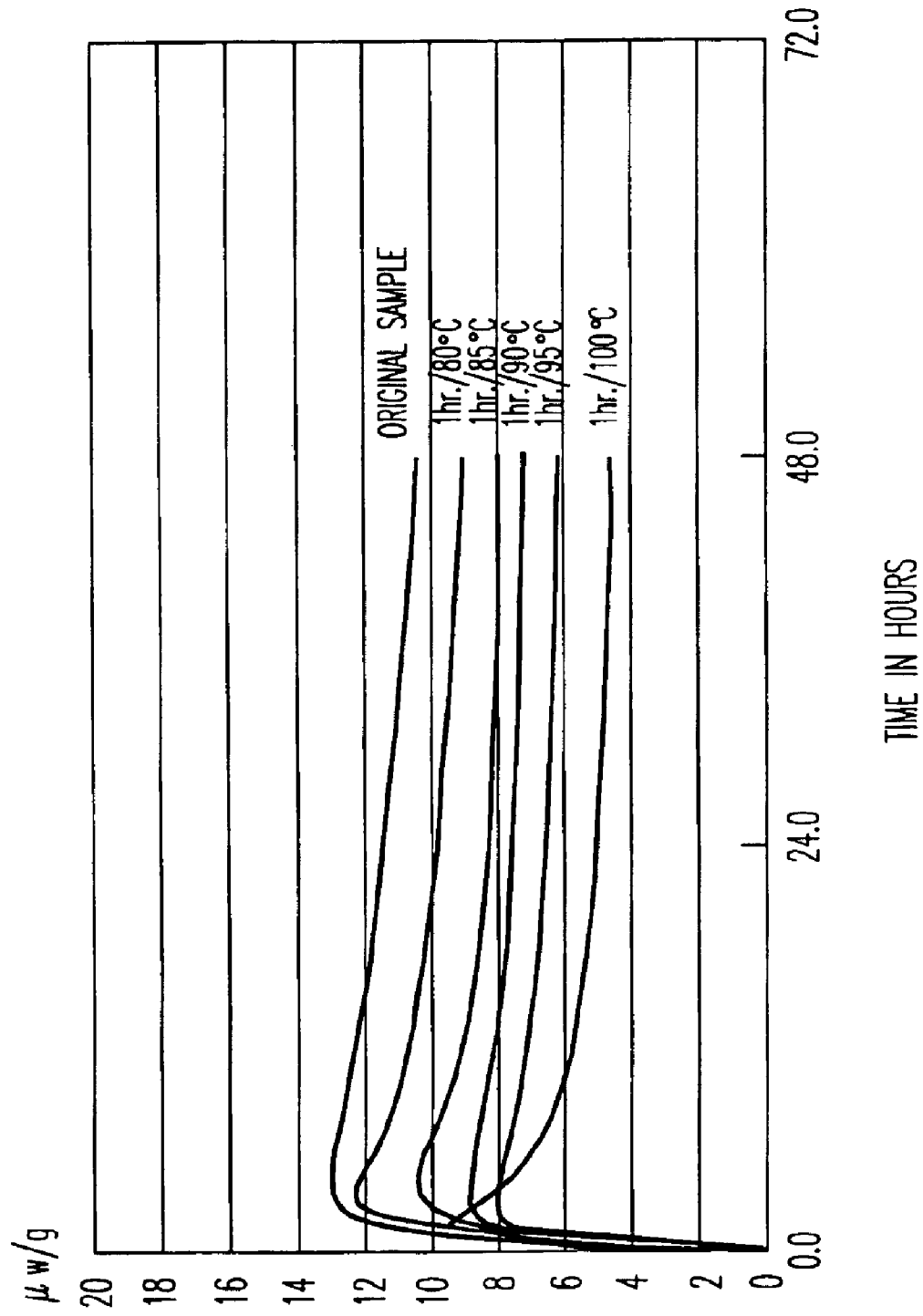

PROCESS FOR IMPROVING THE INTERNAL STABILITY OF SODIUM PERCARBONATE

CROSS-REFERENCE TO RELATED APPLICATIONS

The present application claims priority to German Application No. DE 10065953.5, filed on Dec. 23, 2000, which is hereby incorporated by reference in it entirety.

BACKGROUND OF INVENTION

1. Field of the Invention

The invention relates to uncoated and/or coated sodium percarbonate with improved internal stability and storage stability; and, a process that provides uncoated and/or coated sodium percarbonate with improved internal stability and storage stability.

2. Discussion of the Background

Sodium carbonate peroxohydrate, known commercially as sodium percarbonate, can be used readily to replace perborates as an oxidizing agent in detergents, washing agents, bleaching agents, cleaning agents, and compositions thereof. When compared to chlorine-type agents, sodium percarbonate is slightly inferior in its bleaching effect. However, sodium percarbonate acts more gently, reducing damage to surfaces. Moreover, yellowing is markedly reduced when sodium percarbonate is applied to surfaces comprising synthetic fibers, animal fibers, resin-processed fibers and fibers treated with fluorescent whitening agents. Furthermore, sodium percarbonate is highly soluble in water, with rapid liberation of hydrogen peroxide instead of a poisonous gas, such as chlorine. Therefore, sodium percarbonate is a more gentle oxidizing agent that produces environmentally safe decomposition products, thereby making home and business use of sodium percarbonate as an oxidizing agent very attractive.

Conventional production of sodium percarbonate comprises reacting hydrogen peroxide with sodium carbonate using four different processes: crystallization processes, spray processes, slurry processes, and dry processes. All of which may be adapted for use in mixers, fluid bed reactors, and/or tubular reactors. Such processes may or may not require the presence of stabilizers. Furthermore, granulating aids may be added to the reaction. The above-mentioned processes include a conventional drying step during and/or after the production of sodium percarbonate to reduce moisture to a level sufficient for commercial sodium percarbonate.

The limited stability of sodium percarbonate is caused by the presence of humid air and/or water chemically bound to ingredients or detergents, like zeolites, which cause sodium percarbonate to lose active oxygen during storage.

JP-A 57-42510 describes a process to stabilize sodium percarbonate. The sodium percarbonate at elevated temperature is transferred from a drier to a storage container. Cool air at room temperature and at most 70% humidity is then fed to the storage container. The sodium percarbonate is cooled. Concurrently, the atmosphere in the storage container is replaced by cool air. At the same time the cool air is passed through the sodium percarbonate in the storage container to cool the contents, the water content is reduced. Therefore, the storage life of sodium percarbonate under high atmospheric humidity is elevated, and the tendency for the sodium percarbonate to agglomerate is reduced. However, the stability of sodium percarbonate during storage is needed to improve. Further, this document does not give describe if the process affects the internal stability of sodium percarbonate, nor does it describe how the internal stability may be increased.

EP-Patent 0 396 175 B1 describes another process for the stabilization of sodium perborate monohydrate granules that are stored as loose granules in bulk. Further, the granules are stored in a sealed room at a temperature between 10 and 65° C. In this process, dry air is continuously passed through the stored material throughout its storage. The dew point of the dry air should be below −20° C. and the amount of dry air should be between 1 and 8 $Nm^3/(h \cdot t_{NaPb})$. There are disadvantages to this process because large amounts of dry air having a very low dew point must be passed through the stored material during the overall storage time. Further, there is no indication that the process could be adapted to the storage of sodium percarbonate and there is no indication as to how the internal stability of the stored product is improved by this process.

The general prevailing opinion at a date prior to the present invention is that the active oxygen content of sodium percarbonate decreases as the temperature and action time increases. Therefore, this general prevailing opinion suggested that such conditions should be avoided.

SUMMARY OF THE INVENTION

An object of the present invention is to increase the stability of uncoated or coated sodium percarbonate during storage.

Another object of the present invention is to provide uncoated or coated sodium percarbonate having increased internal stability.

Another object of the present invention is to provide uncoated or coated sodium percarbonate maintaining constant high active oxygen content during storage.

Another object of the present invention is to provide uncoated or coated sodium percarbonate having a low TAM value as measured by microcalorimetry.

Another object of the present invention is a process for the production of uncoated or coated sodium percarbonate that may be implemented following conventional processes wherein hydrogen peroxide is reacted with sodium carbonate; including crystallization processes, spray processes, slurry processes, and dry processes; in mixers, fluid-based reactors, tubular reactors, and dryers.

Another object of the present invention is a process for the production of uncoated or coated sodium percarbonate having increased storage stability.

Another object of the present invention is a process for the production of uncoated or coated sodium percarbonate having increased internal stability.

Another object of the present invention is a process for the production of uncoated or coated sodium percarbonate maintaining constant high active oxygen content during storage.

Another object of the present invention is a process for the production of uncoated or coated sodium percarbonate having a low TAM value as measured by microcalorimetry.

Another object of the present invention is a thermal treatment at high temperature following conventional production processes that provides uncoated or coated sodium percarbonate having constant high active oxygen, thereby lowering the TAM value and increasing stability during storage.

Another object of the present invention is a thermal treatment of sodium percarbonate that maintains active oxygen content of the sodium percarbonate that is virtually constant and reduces the TAM value of the sodium percarbonate; thereby increasing the internal stability of sodium percarbonate and improving the storage stability of sodium percarbonate.

Another object of the present invention is a thermal treatment of sodium percarbonate that disintegrates the crystal defects in the sodium percarbonate crystal lattice.

The above descriptions highlight certain aspects and embodiments of the present invention. Additional objects, aspects, and embodiments of the present invention follow in the detailed description of the present invention considered together with the Examples and Figures.

BRIEF DESCRIPTION OF THE DRAWINGS

FIG. 1: The course of the TAM measurement of sodium percarbonate thermally treated according to the present invention at different temperatures in a fluidized bed unit.

DETAILED DESCRIPTION OF THE PRESENT INVENTION

Unless specifically defined, all technical and scientific terms used herein have the same meaning as commonly understood by a skilled artisan in chemistry.

"Sodium percarbonate" is uncoated sodium percarbonate as well as coated sodium percarbonate. Sodium percarbonate according to the present invention includes uncoated sodium percarbonate that has been produced by a conventional process.

"Coated sodium percarbonate" is sodium percarbonate comprising one or more stabilizing coating layers. Coated sodium percarbonate according to the present invention includes coated sodium percarbonate that has been produced by a conventional process.

"Stabilizing coating layer" is any layer comprised of a chemical that increases the stability of sodium percarbonate and may include coating layers comprising, for example, alkali sulfates, sodium carbonate, sodium bicarbonate, and alkali metal silicates like water glass, borates and perborates, magnesium sulfate, and magnesium salts of carboxylic acids. Stabilizing coating layers are not restricted to stabilizing coating layers comprising chemicals other than those stated above, but may comprise other inorganic and organic chemicals.

"Conventional processes" include, for example, crystallization processes, spray processes, slurry processes, dry processes, and any combination thereof. Such processes include specialized processes, for example, fluidized bed-spray granulation processes. The conventional production processes involve the step of reacting hydrogen peroxide with soda and also a drying step in order to separate the water present in the reaction. Finally, conventional processes include production processes in which an aqueous hydrogen peroxide solution is applied to pulverulent soda followed by a drying stage.

Although methods and materials similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. Further, the materials, methods, and examples are illustrative only and are not intended to be limiting.

Reference is made to standard textbooks of general, inorganic, and physical chemistry that contain definitions and methods and means for carrying out basic scientific techniques, encompassed by the present invention. Further, reference is made to standard reference materials of technology. See, for example, Kirk-Othmer, Encyclopedia of Chemical Technology (fourth edition), New York (1996) and various references cited therein.

The present invention relates to providing sodium percarbonate with improved internal stability. Sodium percarbonate has a tendency to readily lose active oxygen. Therefore, sodium percarbonate loses its appeal as an oxidizing and bleaching agent as it degrades.

Interaction of sodium percarbonate with moisture and other components, such as transition elements, leads to degradation of the peroxide within sodium percarbonate and release of the activated oxygen. Water is a decomposition product, and consequently, can catalyze further decomposition of sodium percarbonate. Such circumstances are accelerated when sodium percarbonate is in contact with a moist atmosphere and/or with mixtures of active components, which can commonly arise in washing and cleaning agents. The invention provides a process whereby the internal stability of sodium percarbonate can be improved compared to that achieved within the scope of a conventional production process, including conventional drying processes.

Sodium percarbonate can be produced by the crystallization process. For this purpose, a solution or suspension of soda is reacted with hydrogen peroxide and crystallized. Because of the high solubility of sodium percarbonate, however, it is necessary to salt out the sodium percarbonate from the reaction mixture in order to increase the yield. The crystallization process is difficult to control so that it is recommended to add substances that improve such crystallization, such as polyphosphate or polyacrylate, in order to form an advantageous crystal load. The crystallized sodium percarbonate is then removed by centrifuging and dried.

The crystallisation process according to U.S. Pat. No. 4,146,571 is one such example. U.S. Pat. No. 4,146,571 discloses a process where hydrogen peroxide and soda are reacted in a mother liquor containing sodium chloride. The crystallisation process can be carried out in the presence of magnesium compounds in order to maintain stability. After the crystallisation process, the sodium percarbonate is separated in a conventional device for the solid-liquid separation from the mother liquor and is then dried in a drier. An example of a drier would be a fluidized bed drier.

In spray processes, a mixture of an aqueous solution or a low concentration suspension of soda and hydrogen peroxide is dried in a spray dryer. The spray drying processes of the state of the art, like that according to GB 722 351, preferably operate with solutions.

As to a preferred variation of spray processes, solutions of soda and hydrogen peroxide, for example, are continuously sprayed onto a bed of sodium percarbonate fluidized with hot air, e.g. see GB 1300855. The spray and the drying stage can be carried out alternatively in a single or in two stages. In such spray processes, solutions of sodium carbonate and hydrogen peroxide can be sprayed through separate nozzles or a single nozzle if using a premixed solution into a reaction chamber, a hot mixture of air and carbon dioxide being passed simultaneously through the reaction chamber, see German Patent No. 2733935.

A further variation of the spray process, for example, is the fluidized bed-spray granulation process according to U.S. Pat. No. 5,560,896. During this process, an aqueous hydrogen peroxide solution and an aqueous soda solution are sprayed using a three-fluid atomizing nozzle into a fluidized bed that contains sodium percarbonate particles having a diameter less than that of the particles to be produced. During the spraying-in of the reactants in an aqueous medium, water is evaporated at a fluidized bed temperature in the range from 40 to 95° C. After completion of the spraying process, the fluidized bed material is cooled.

The slurry process for the production of sodium percarbonate comprises intensive mixing of aqueous hydrogen peroxide solution with sodium carbonate, while maintaining a constant reaction temperature. The reaction slurry is then formed, followed by subjecting the slurry to short-term drying. The slurry may undergo simultaneous and/or subsequent granulation to obtain the particulate sodium percarbonate with the desired grain size and bulk density. Other additives, such as common stabilizers and/or granulating aids may be added.

According to the dry processes, sodium percarbonate is produced by reacting anhydrous or hydrated sodium carbonate with a concentrated hydrogen peroxide solution of 50–80% by weight and evaporating the small quantities of liberated water during the reaction. In the case of this process, an essentially dry reaction mixture is present throughout the entire reaction. The process can be carried out in mixers, fluid bed reactors, or tubular reactors with input spray devices.

The above-mentioned processes may produce sodium percarbonate having insufficient storage stability. Therefore, these processes have been modified and/or appended to increase its stability. Examples of modified processes include production processes of coated sodium percarbonate with one or more stabilizers. Stabilizers for this purpose may be, for examples, water glass, inorganic phosphonic acids, organic phosphonic acids, alkali sulfates, sodium carbonate, sodium bicarbonate, water glass, borates and perborates, magnesium sulfate, and magnesium salts of carboxylic acids, etc. Such coating processes are known from many documents, e.g. EP 0863842, EP 0992575, EP 0622553, DE 2622610, WO 94/1470. Furthermore, granulating aids may be added to the reaction.

Coating sodium percarbonate with one or more stabilizing coating layers stabilizes the sodium percarbonate in the presence of detergent constituents such as zeolites. However, this coating has only a limited influence on the self-decomposing properties of sodium percarbonate. Although the self-decomposing properties can be avoided to a certain extent in the production of sodium percarbonate by using stabilisers such as magnesium salts and water glass, a further improvement in the stability of sodium percarbonate is desirable in order to improve the storage life of sodium percarbonate. For example, in the case where sodium percarbonate is coated using an aqueous solution containing coating components that generally takes place in a fluidized bed, the water of the coating solution is evaporated in the fluidized bed and a coated sodium percarbonate is obtained.

The invention provides a process that preferably takes place where the conventional processes and/or coating processes end. Therefore, the inventive step of the process according to the invention may be adapted to be added after the drying step of the above-described conventional processes. That is, it should be carried out in any apparatus that is readily available for use in tandem with the conventional processes described above to produce a sodium percarbonate with increased stability. Such apparatus includes, for example, fluid-bed reactors or other conventional reactors and dryers.

The invention provides a process involving a thermal treatment. The thermal treatment according to the invention is preferably carried out in a fluidized layer, whereby during the treatment suitably heated air is passed through the fluidized layer in order to adjust and maintain the treatment temperature. The air heated up to the treatment temperature is either atmospheric air or atmospheric air that has been directly heated by means of flue gases. Furthermore, air with low moisture content is preferred. The term "fluidized layer" is understood to include all states under which the air heated to the treatment temperature can be passed through a layer of particulate sodium percarbonate. As long as the sodium percarbonate is sufficiently granular, the treatment can also take place below the loosening point of the layer.

The treatment process of the process according to the invention may be carried out in a fluidized bed immediately following the drying stage. Significant advantages of the process according to the invention is to produce sodium percarbonate having increased internal stability. In the preferred embodiment, the thermal treatment is carried out in a fluidized layer, as is already available within the framework of a preceding drying procedure as the last stage in a production and/or coating process.

The invention provides a process in which dry sodium percarbonate is treated for at least two minutes at a temperature from 70 to 120° C. as the ambient air surrounding the particles is being replaced. Ambient air replacement is performed in order to maintain the moisture at a constant value. According to a preferred embodiment, the thermal treatment of the sodium percarbonate is carried out at a temperature in the range from 80 to 95° C., in particular from 85 to 95° C. The treatment time preferably ranges from 5 to 60 minutes, in particular 10 to 60 minutes. At a temperature above 95 to 120° C., the treatment time is in the lower range. The person skilled in the art will determine the optimum conditions by preliminary experiments, which depend on the nature of the production, the atmospheric humidity, and the intensity of the air replacement.

Even under essentially dry storage conditions and absence of external destabilizing compounds, sodium percarbonate may release active oxygen, what is an exothermic reaction. Therefore, the internal stability of sodium percarbonate can be measured by monitoring the heat released during storage. Methods such as microcalorimetry, for example, can therefore be used to obtain such a measurement. Therefore, measuring the internal stability of sodium percarbonate is obtainable.

The internal stability of sodium percarbonate can be represented as a TAM value, according to which the stability increases with decreasing TAM value. A good storage life is indicated by a low TAM value. The TAM value should preferably be below 10 $\mu$W/g and in particular below 8 $\mu$W/g for sodium percarbonate. The TAM value is a microcalorimetric determination of the energy released during storage, measured by means of the TAM® Thermal Activity Monitor from Thermometric AB, Järfälla (Sweden). The TAM features four measuring cylinders, each containing a pair of measuring cups sandwiched between a pair of Peltier thermopile heat sensors. The cylinders are surrounded by an infinite heat sink: a water bath that can be maintained at a temperature. The thermopile heat sensor elements of the two measuring cups in each cylinder are connected in series but in opposition, so that the resultant signal represents the difference in heat flow from the two cups. One contains the sample and the other contains a reference. As the sodium percarbonate degrades, it gives off heat and tries to restore thermal equilibrium with the waterbath. The flow of this heat is detected, measured, and converted to a TAM value in $\mu$W/g.

It has previously been thought that the active oxygen content of sodium percarbonate falls as the temperature and the action time of the production process increases. Therefore, it has been thought that production processes of sodium percarbonate should avoid elevated temperatures and action times.

Under the conditions according to the invention, the thermal treatment at the high temperatures prescribed produces sodium percarbonate having an active oxygen content that is virtually constant, yet the TAM value of the sodium percarbonate drops considerably at the same time. That is, the internal stability of sodium percarbonate is raised and the storage life is improved at the high temperatures prescribed by the thermal treatment of the present invention. It is assumed that this increase in the internal stabilization of sodium percarbonate is attributable to a decrease in the defects of its crystal lattice structure.

As can be seen from the examples, the thermal treatment according to the present invention can significantly reduce the TAM value of sodium percarbonate. The reduction of the TAM value in the sodium percarbonate ranges from 20 to 50% of the initial value and in some cases even more.

The present invention is explained in more detail with the aid of the following embodiment examples.

EXAMPLES

Examples 1 to 5

Thermally treating sodium percarbonate coated with sodium sulfate according to the present invention.

The process according to the invention was carried out in a fluidized bed drier. Suitably heated atmospheric air was used to produce the fluidized bed. In each case, coated sodium percarbonate was thermally treated for one hour using atmospheric air. Table 1 shows the temperature of the fluidized bed, the active oxygen values (Oa %) of the sodium percarbonate, the values for the weight loss (wt. %) of the sodium percarbonate determined by means of an IR balance, and the measured TAM values of the sodium percarbonate. The TAM measurement was carried out using the thermo-activator monitor from Thermometric AB, Spjutvägen 5a, S-175 61, Järfälla. Measurements were made over 48 hours of storage at 40° C. in a measurement cell.

TABLE 1

| No. | T (° C.) | Oa (%) | Weight Loss (%) (IR Balance) | TAM Value ($\mu$W/g) |
| --- | --- | --- | --- | --- |
| Start |  | 13.7 | 1.3 | 10.6 |
| 1 | 80 | 13.7 | 1.0 | 9.3 |
| 2 | 85 | 13.7 | 0.8 | 8.1 |
| 3 | 90 | 13.6 | 1.0 | 7.3 |
| 4 | 95 | 13.5 | 1.1 | 6.3 |
| 5 | 100 | 13.0 | 1.5 | 4.8 |

Example 6

An uncoated sodium percarbonate fluidized bed granulate produced in a laboratory fluidized bed-spray granulation unit having an Oa value of 13.5% and a TAM value of 7.5 $\mu$W/g was thermally treated according to the invention in a fluidized bed. After the addition of the granules to a fluidized bed drier, the fluidized bed temperature was adjusted to 100° C. first. Then the temperature was increased to 120° C. for a time of 2 minutes. The resultant product had an Oa content of 13.58 wt. % and a TAM value of 5.5 $\mu$W/g. The TAM measurement was carried out using the thermo-activator monitor from Thermometric AB, Spjutvägen 5a, S-175 61, Järfälla. Measurements were made over 48 hours of storage at 40° C. in a measurement cell.

Numerous modifications and variations on the present invention are possible in light of the above teachings. It is, therefore, to be understood that within the scope of the accompanying claims, the invention may be practiced otherwise than as specifically described herein.

What is claimed is:

1. A process, consisting essentially of:

thermally treating coated or uncoated dry sodium percarbonate with continuously replacing ambient air for a time of at least 2 minutes at a temperature from 70° C. to 120° C.;

wherein the thermally treating does not result in a substantial reduction of the oxygen and moisture content of the dry sodium percarbonate.

2. The process according to claim 1, wherein the temperature is from 85° C. to 95° C.

3. The process according to claim 1, wherein the time is from 5 to 60 minutes.

4. The process according to claim 1, wherein the time is from 10 to 60 minutes.

5. The process according to claim 1, wherein the sodium percarbonate is in a fluidized layer, atmospheric air is heated to a treatment temperature from 70° C. to 120° C.; and the atmospheric air is passed through the fluidized layer.

6. The process according to claim 5, wherein the atmospheric air is heated by flue gases.

7. The process according to claim 5, wherein the thermal treatment is performed in a fluidized bed.

8. The process according to claim 5, wherein the atmospheric air is heated to a treatment temperature from 80° C. to 95° C.

9. The process according to claim 1, wherein the sodium percarbonate is uncoated.

10. The process according to claim 1, wherein the sodium percarbonate is coated and the coated sodium percarbonate is thermally treated immediately following a drying step subsequent to a coating process of sodium percarbonate.

11. The process according to claim 10, wherein the temperature is from 85° C. to 95° C.

12. The process according to claim 10, wherein said thermally treating of the sodium percarbonate occurs from 10 to 60 minutes.

13. The process according to claim 11, wherein said thermally treating of the sodium percarbonate occurs from 10 to 60 minutes.

* * * * *